(12) United States Patent
Hassan et al.

(10) Patent No.: US 9,479,906 B1
(45) Date of Patent: Oct. 25, 2016

(54) MANAGING REGISTRATION WITH A PUSH-TO-TALK COMMUNICATION SYSTEM

(71) Applicant: Sprint Spectrum LP, Overland Park, KS (US)

(72) Inventors: Kafi Hassan, Fairfax, VA (US); Nawara Owary, Vienna, VA (US); Nagi Mansour, Arlington, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 103 days.

(21) Appl. No.: 14/135,448

(22) Filed: Dec. 19, 2013

(51) Int. Cl.
*H04W 4/08* (2009.01)
*H04W 60/00* (2009.01)

(52) U.S. Cl.
CPC ............... *H04W 4/08* (2013.01); *H04W 60/00* (2013.01)

(58) Field of Classification Search
CPC ......... H04W 4/10; H04W 4/02; H04W 4/12; H04W 60/00; H04W 76/005; H04W 4/16; H04W 36/14; H04W 76/007; H04W 4/22; H04W 2242/04; H04W 4/06; H04W 8/265; H04W 8/245; H04W 92/02; H04W 88/06; H04W 48/16

USPC ......... 455/404.1, 414.1, 418–419, 448, 56.1, 455/456.4, 466, 550.1, 565, 564, 552.1, 455/553.1

See application file for complete search history.

(56) References Cited

U.S. PATENT DOCUMENTS

| | | | |
|---|---|---|---|
| 8,504,017 B1 * | 8/2013 | Hietalahti et al. | 455/426.1 |
| 2007/0230440 A1 * | 10/2007 | Joong et al. | 370/352 |
| 2011/0305192 A1 * | 12/2011 | Faccin | H04W 48/18 370/328 |
| 2013/0003652 A1 * | 1/2013 | Rados et al. | 370/328 |

* cited by examiner

*Primary Examiner* — George Eng
*Assistant Examiner* — Umair Ahsan

(57) ABSTRACT

A wireless device is determined to be in communication with a first access node is at a location in a coverage area of a first communication network, and it is determined whether the wireless device is in communication with the first access node using a first radio access technology or a second radio access technology. The availability of the first r and the second radio access technologies from the first communication network are determined, and the wireless device is permitted to register with the PTT communication system when the wireless device is in communication with the access node using the first radio access technology. Further, the wireless device is prevented from registering with the PTT communication system when the wireless device is in communication with the access node using the second radio access technology and the first radio access technology is available for the wireless device.

10 Claims, 5 Drawing Sheets

MANAGING REGISTRATION WITH A PUSH-TO-TALK COMMUNICATION SYSTEM

TECHNICAL BACKGROUND

Communication systems can provide wireless devices with a variety of communication services. One such service is a push-to-talk (PTT) communication service. A push-to-talk communication session typically comprise two-way, half-duplex communications using a floor control mechanism to govern whether a wireless device can transmit or whether the wireless device must receive at a given time. Wireless devices capable of multiple functions can establish communication with a communication network (for example, for a data session, or for full duplex voice communication services, and the like), and then attempt to register with a PTT communication system of the communication network. Some advantages of a PTT communication system comprise relatively short call setup times and relatively low latency generally in the communication system. Accordingly, it is desirable to provide a wireless device using a PTT communication system with a communication link comprising a relatively high data rate, relatively low communication link congestion, and the like, to meet operational requirements of the PTT communication service.

OVERVIEW

In operation, it is determined that a wireless device in communication with a first access node is at a location in a coverage area of a first communication network, and it is further determined whether the wireless device is in communication with the first access node using a first radio access technology or a second radio access technology.

Next, for the wireless device at the location, the availability of the first radio access technology and the second radio access technology from the first communication network is determined. In an embodiment, the wireless device can be in communication with the first communication network using the second radio access technology, and the first radio access technology can be available for the wireless device.

When the wireless device is in communication with the access node using the first radio access technology, the wireless device is permitted to register with the PTT communication system. Further, when the wireless device is in communication with the access node using the second radio access technology and the first radio access technology is available for the wireless device, the wireless device is prevented from registering with the PTT communication system.

DETAILED DESCRIPTION

Figure 1:
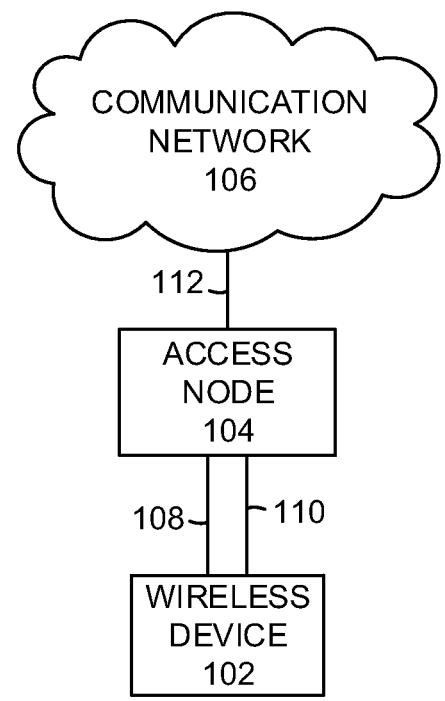
FIG. 1 illustrates an exemplary communication system to manage registration of a wireless device with a PTT communication system.

FIG. 1 illustrates an exemplary communication system 100 to manage registration of a wireless device with a PTT communication system comprising wireless device 102, access node 104, and communication network 106. Examples of wireless device 102 can comprise a cell phone, a smart phone, a computing platform such as a laptop, palmtop, or tablet, a personal digital assistant, or an internet access device, including combinations thereof. Wireless device 102 can communication with access node 104 over communication links 108 and 110. In an embodiment, communication link 108 comprises a first radio access technology and communication link 110 comprises a second radio access technology. Different radio access technologies may comprise differing characteristics such as available frequency bands, maximum data rates, achievable data rates, and the like.

Access node 104 is a network node capable of providing wireless communications to wireless device 102, and can be, for example, a base transceiver station, a radio base station, an eNodeB device, or an enhanced eNodeB device. Access node 104 is in communication with communication network 106 over communication link 112.

Communication network 106 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 106 can be capable of carrying voice information and other data, for example, to support communications by a wireless device such as wireless device 102. Communication network 106 can be configured to provide, among other things, a PTT communication system with which wireless device 102 may register, and to provide PTT communication services to wireless device 102. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 106 may also comprise a wireless network, including base stations, wireless communication nodes, telephony switches, internet routers, network gateways, computer systems, communication links, or some other type of communication equipment, and combinations thereof.

Communication links 108, 110, and 112 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 104 and communication network 106 which are omitted for clarity, including additional processing nodes, routers, gateways, and physical and/or wireless data links for carrying data among the various network elements.

Push-to-talk (PTT) communication comprises a service which can be provided in communication systems to enable a "walkie talkie"-type communication in which a wireless device uses a half-duplex communication mode. Multiple wireless devices may participate in a communication session in which one party can transmit voice or other information at a time, and a floor control system may be employed to govern which wireless device is permitted to transmit and which wireless devices are required to listen. Examples of PTT communication systems include Integrated Digital Enhanced Network (iDEN), Push-To-Talk over Cellular (PoC), and others.

Wireless devices can establish communication with a communication network (capable of providing a data session, a full duplex voice communication services, and the like), and then may attempt to register with a PTT communication system of the communication network. Advantages of a PTT communication system include relatively short call setup times and relatively low latency in the communication system. To meet these and other operational requirements of the PTT communication service, it is desirable to provide a wireless device using a PTT communication system with a communication link comprising a relatively high data rate, relatively low communication link congestion, and the like. The provision of PTT and other communication services to a wireless device may be affected at least in part by the radio access technology employed.

Communication system 100 can be configured to provide communication services using a plurality of radio access technologies. The communication services include PTT communication services, as well as interconnect services, data services, and so forth. The different radio access technologies can provide different maximum and average data rates, network latency, network transport speeds, and the like. As one example, a communication system can utilize 1×RTT (Radio Transmission Technology) and 1×EV-DO (Evolution-Data Optimized, or simply EV-DO) radio access technologies. 1×RTT comprises wireless air interface standard for CDMA2000 wireless network communication standards, and can support data speeds of up to 153 kbps, averaging 60-100 kbps in operation. EV-DO comprises a transmission standard for 3rd generation (3G) wireless networks intended to support, among other things, high speed data communications, can provide data rates over ten times faster than 1×RTT. Comparatively, 1×RTT and EVDO can provide different maximum and average data rates, network latency, network transport speeds, and the like. Other examples are also possible.

In operation, it is determined that wireless device 102 is in communication with access node 104, and further is at a location in a coverage area of a first communication network. It is further determined whether the wireless device is in communication with the first access node using a first radio access technology (for example, over communication link 108) or a second radio access technology (for example, over communication link 110). Additionally, the availability of the first radio access technology and the second radio access technology from the first communication network for the wireless device at the location are determined. For example, while communication links 108 and 110 are illustrated for purposes of illustrating technical capabilities, wireless device 102 may be in a location in which the first radio access technology, the second radio access technology, or both, are not available from the first communication network.

When wireless device 102 attempts to register with a PTT communication system, wireless device 102 is permitted to register with the PTT communication system when wireless device 102 is in communication with access node 104 using the first radio access technology. Additionally, wireless device 102 is prevented from registering with the PTT communication system when wireless device 102 is in communication with access node 104 using the second radio access technology and the first radio access technology is available for wireless device 102. Registration with a PTT communication service can comprise receiving a request for the PTT communication network from wireless device 102 to be permitted to use the PTT communication service, authenticating credentials of wireless device 102 for the PTT communication system, and granting wireless device 102 access to PTT communication services over the PTT communication system. It will be understood that the process of registration with a PTT communication system comprises a signaling process that can be performed in "real time", i.e., immediately following the receipt of an access request from a wireless device. Further, registration as used herein should not be confused with "signing up" for wireless service, subscribing for service with a network provider, creating an account with a network provider, etc., as a user may do when the user purchases a new phone, changes from one network provider company to another, and the like.

Figure 2:
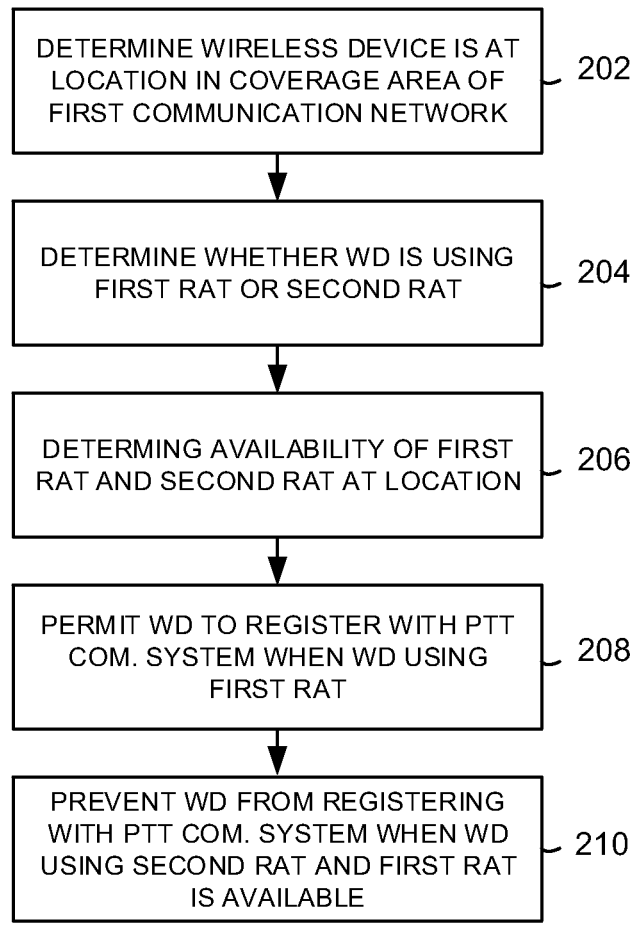
FIG. 2 illustrates an exemplary method of managing registration of a wireless device with a PTT communication system.

FIG. 2 illustrates an exemplary method of managing registration of a wireless device with a PTT communication system. In operation 202, it is determined that a wireless device in communication with a first access node is at a location in a coverage area of a first communication network. The determination can comprise ascertaining a geographic location of wireless device 102. The geographic location of wireless device 102 can be compared to a geographic distribution of communication services provided by a first communication network. For example, the location of wireless device 102 can substantially match a service area of a first communication network. The location of wireless device 102 can also be near or within one or more coverage areas of an access node associated with the first communication network.

Next, it is determined whether the wireless device is in communication with the first access node using a first radio access technology or a second radio access technology (operation 204). To establish communication with access node 104, wireless device 102 may send a request to access node 104 for to be granted a channel over a frequency band. Based on availability of communication resources, network congestion, capabilities of wireless device 102, and other factors, access node 104 can grant the channel to wireless device 102. Access node 104 can also indicate to wireless device 102, among other things, a radio access technology which will be employed over the channel. When wireless device 102 is in communication with access node 104, a determination can be made of the radio access technology which is in use by wireless device 102 and access node 104.

The availability of the first radio access technology and the second radio access technology from the first communication network for the wireless device at the location is also determined (operation 206). Based on the location of wireless device 102, differing physical and logical communication resources may be available to wireless device 102. For example, based on the location of wireless device 102, access node 104 may be able to support communications using the first radio access technology and/or the second radio access technology. Where wireless device 102 and access node 104 are in communication using one radio access technology, the other radio access technology may or may not be available. For example, only the first or the second radio access technology may be available to wireless device 102. This may be due to the capabilities of access node 104 or the available frequency bands of access node 104 (which may or may not be capable of supporting the first or second radio access technology). The location of wireless device 102 relative to access node 104 may also affect the availability of radio access technologies to wireless device 102, such as where wireless device 102 is located in an area experiencing radio frequency interference negatively affecting a radio access technology, or where a structure or topographical feature interferes with one or more radio access technologies between wireless device 102 and access node 104, and the like. The availability of the first and second radio access technologies can be determined based on the location of the wireless device within the coverage area of the first communication network. Alternatively, or additionally, the wireless device may provide an indication of the availability of the first and second radio access technologies based, for example, on signals received from an access node. Alternatively, or additionally, an access node identifier can be used to determine whether the first and second radio access technologies are available from the access node, and/or from neighbor access nodes of the access node.

In operation 208, the wireless device is permitted to register with the PTT communication system when the wireless device is in communication with the access node using the first radio access technology. Based on a registration request from wireless device 102 to register with the PTT communication system, depending on the availability of certain radio access technologies, wireless device 102 may be permitted to authenticate with the PTT communication system and receive PTT communication services, such as initiating and receiving PTT communication sessions, and the like. For example, when wireless device 102 is in communication with access node 104 using the first radio access technology, wireless device 102 can be permitted to register with the PTT communication system. Wireless device 102 will then be enabled, among other things, to initiate and/or receive PTT communication session requests and to participate in PTT communication sessions.

In addition, the wireless device is prevented from registering with the PTT communication system when the wireless device is in communication with the access node using the second radio access technology and the first radio access technology is available for the wireless device (operation 210). As mentioned, based on a registration request from wireless device 102 to register with the PTT communication system, depending on the availability of certain radio access technologies, wireless device 102 may be permitted to authenticate with the PTT communication system and receive PTT communication services, such as initiating and receiving PTT communication sessions, and the like. For example, when wireless device 102 is in communication with access node 104 using the second radio access technology and the first radio access technology is available for the wireless device, wireless device 102 is prevented from registering with the PTT communication system. Wireless device 102 will not be enabled, among other things, to initiate and/or receive PTT communication session requests and to participate in PTT communication sessions.

Figure 3:
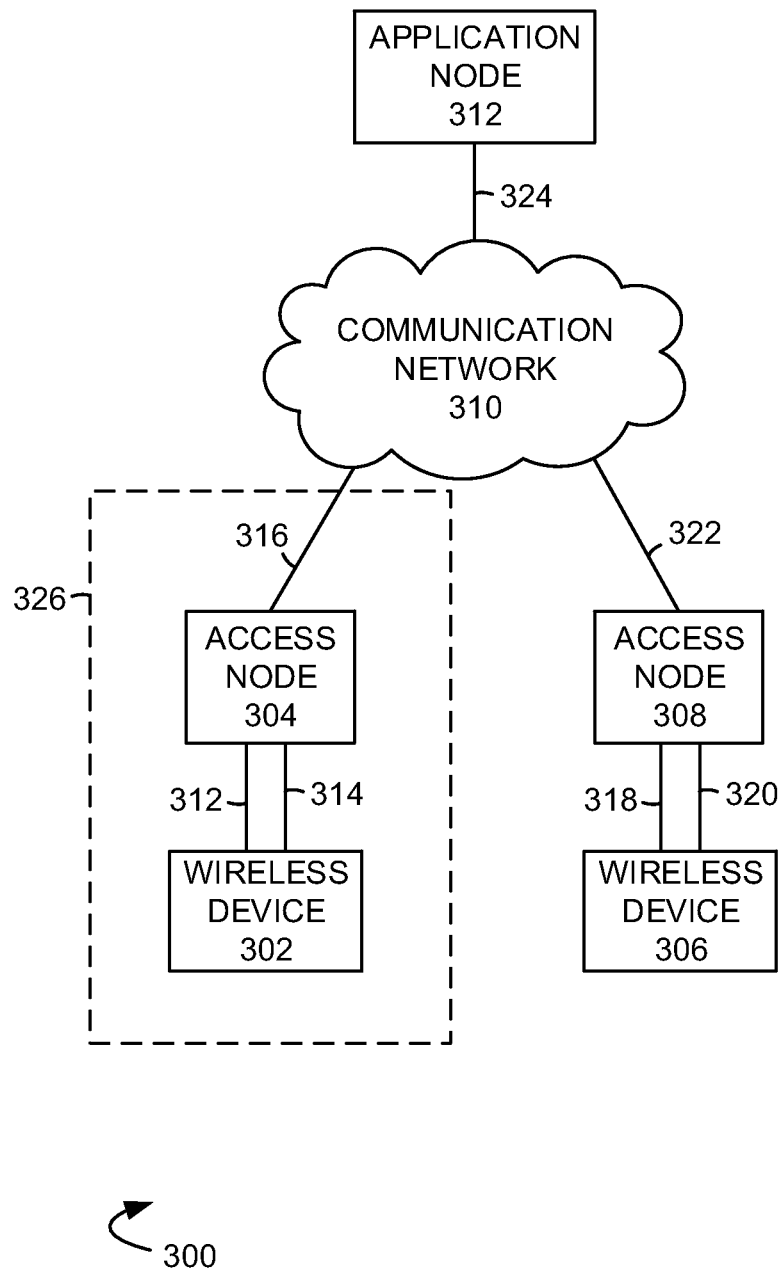
FIG. 3 illustrates another exemplary communication system to manage registration of a wireless device with a PTT communication system.

FIG. 3 illustrates another exemplary communication system 300 to manage registration of a wireless device with a PTT communication system comprising wireless devices 302 and 306, access nodes 304 and 308, communication network 310, and application node 312. Examples of wireless devices 302 and 306 can comprise a cell phone, a smart phone, a computing platform such as a laptop, palmtop, or tablet, a personal digital assistant, or an internet access device, including combinations thereof. Wireless device 302 can communication with access node 304 over communication links 312 and 314. Wireless device 306 can communication with access node 308 over communication links 318 and 320. In an embodiment, communication links 312 and 318 comprise a first radio access technology and communication links 314 and 320 comprise a second radio access technology. Different radio access technologies may comprise differing characteristics such as available frequency bands, maximum and achievable data rates, and the like.

Access node 304 and 308 each comprise a network node capable of providing wireless communications to wireless devices 302 and 306, and can be, for example, a base transceiver station, a radio base station, an eNodeB device, or an enhanced eNodeB device. Access node 304 is in communication with communication network 310 over communication link 316, and access node 308 is in communication with communication network 310 over communication link 322. Access node 304 and wireless device 302 can be located within coverage area 326. Coverage area 326 can comprise a geographic distribution of communication services provided by a first communication network. The communication services can comprise communication services using the first radio access technology and/or the second radio access technology. Access node 308 and wireless device 306 can be located outside of coverage area 326.

Communication network 310 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 310 can be capable of carrying voice information and other data, for example, to support communications by a wireless device such as wireless devices 302 and 306. Communication network 310 can be configured to provide, among other things, a PTT communication system with which wireless devices 302 and 306 may register, and to provide PTT communication services to wireless devices 302 and 306. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (Wi-MAX), and Third Generation Partnership Project Long Term Evolution (3GPP LTE). Wired network protocols that may be utilized by communication network 310 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 310 may also comprise a wireless network, including base stations, wireless communication nodes, telephony switches, internet routers, network gateways, computer systems, communication links, or some other type of communication equipment, and combinations thereof.

Application node 312 can comprise a processor and associated circuitry to execute or direct the execution of computer-readable instructions. An application node can control the setup and maintenance of a communication session over communication network 310 for a wireless device, such as wireless devices 302 and 306. Application node 312 can comprise a dispatch application server (such as a QChat application server, an iDEN application server, and the like), a dispatch call controller (DCC), a mobile switching center (MSC), a mobility management entity (MME), or another similar network element. For dispatch communications, application node 312 can utilize a dispatch communications protocol such as iDEN (Integrated Digital Enhanced Network), PTT over Cellular (PoC), QChat, and the like. Application node 312 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Application node 312 can receive instructions and other input at a user interface. Application node 312 is in communication with communication network 310 over communication link 324.

Communication links 312, 314, 316, 318, 320, 322, and 324 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 304, access node 308, communication network 310, and application node 312 which are omitted for clarity, including additional processing nodes, routers, gateways, and physical and/or wireless data links for carrying data among the various network elements.

Figure 4:
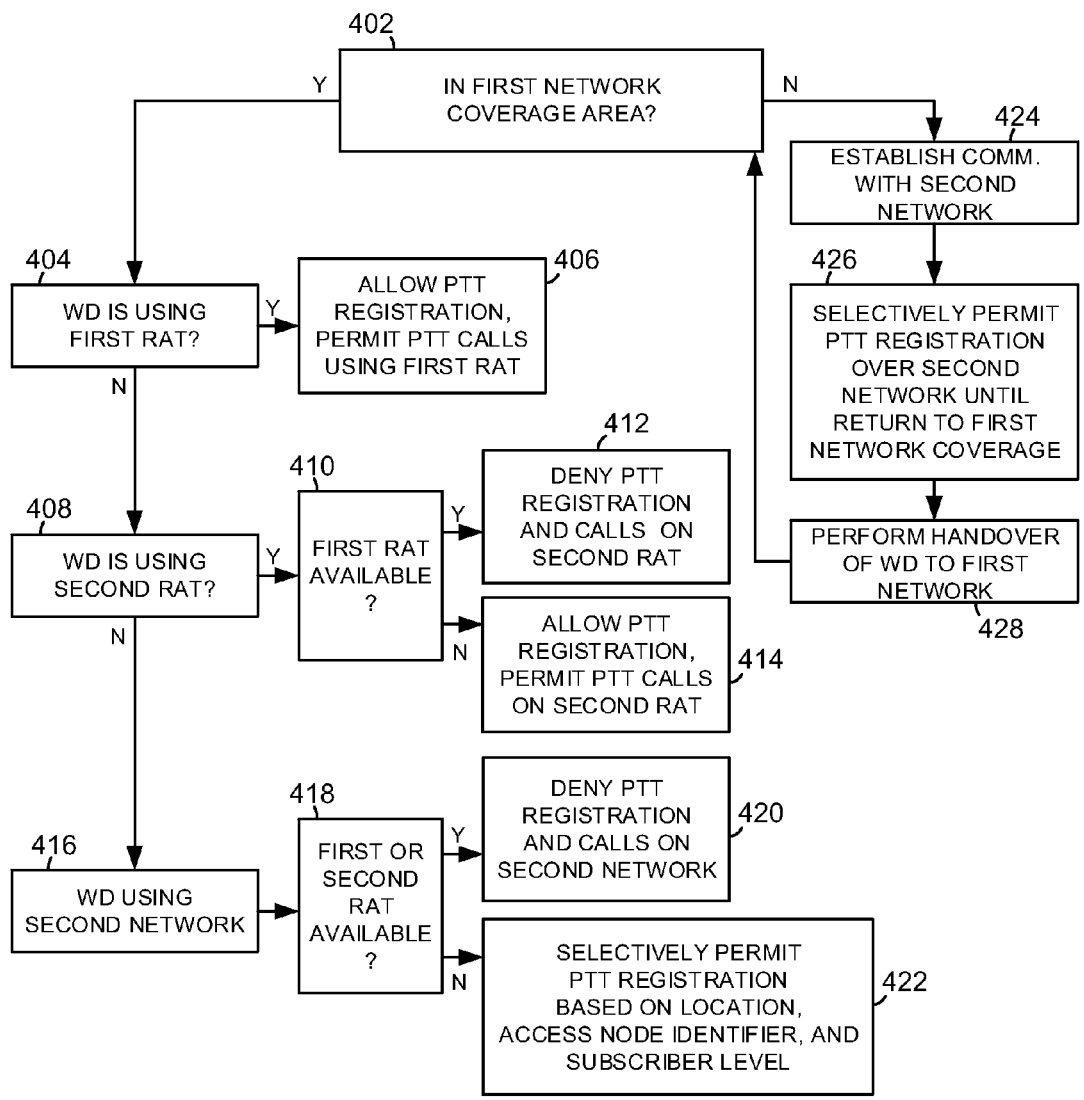
FIG. 4 illustrates another exemplary method of managing registration of a wireless device with a PTT communication system.

FIG. 4 illustrates another exemplary method of managing registration of a wireless device with a PTT communication system. In operation 402, it is determined whether a wireless device is in communication with a first access node at a location in a coverage area of a first communication network. The determination can comprise ascertaining a geographic location of wireless device 302. The geographic location of wireless device 302 can be compared to a geographic distribution of communication services provided by a first communication network, such as coverage area 326. For example, the location of wireless device 302 can substantially match a service area of a first communication network. The location of wireless device 302 can also be near or within one or more coverage areas of an access node associated with the first communication network.

To establish initial communication with access node 304, wireless device 302 may send a request to access node 304 for to be granted a channel over a frequency band. Based on availability of communication resources, network congestion, capabilities of wireless device 302, and other factors, access node 304 can grant the channel to wireless device 302.

When the wireless device is in communication with the first access node at a location in the coverage area of a first communication network (402-Y), it is determined whether the wireless device is in communication with the first access node using a first radio access technology (operation 404). Access node 304 can also indicate to wireless device 302, among other things, a radio access technology which will be employed over the channel. When wireless device 302 is in communication with access node 304, a determination can be made of the radio access technology which is in use by wireless device 302 and access node 304.

When the wireless device is in communication with the access node using the first radio access technology, the wireless device is permitted to register with the PTT communication system (operation 406). Based on a registration request from wireless device 102 to register with the PTT communication system, depending on the availability of certain radio access technologies, wireless device 302 may be permitted to authenticate with the PTT communication system and receive PTT communication services, such as initiating and receiving PTT communication sessions, and the like. For example, when wireless device 302 is in communication with access node 304 using the first radio access technology, wireless device 302 can be permitted to register with the PTT communication system. Wireless device 302 will then be enabled, among other things, to initiate and/or receive PTT communication session requests and to participate in PTT communication sessions.

When the wireless device is not in communication with the first access node at a location in the coverage area of a first communication network using the first radio access technology (402-N), it is determined whether the wireless device is in communication with the first access node using a second radio access technology (operation 408). When the wireless device is in communication with the first access node using the second radio access technology (408-Y), it is determined whether the first radio access technology is available at the location in the coverage area of the first communication network (operation 410). Based on the location of wireless device 302, differing physical and logical communication resources may be available to wireless device 302. For example, based on the location of wireless device 302, access node 304 may be able to support communications using the first radio access technology and/or the second radio access technology. Where wireless device 302 and access node 304 are in communication using one radio access technology, the other radio access technology may or may not be available. This may be due to the capabilities of access node 304 or the available frequency bands of access node 304 (which may or may not be capable of supporting the first or second radio access technology). The location of wireless device 302 relative to access node 304 may also affect the availability of radio access technologies to wireless device 302, such as where wireless device 302 is located in an area experiencing radio frequency interference negatively affecting a radio access technology, or where a structure or topographical feature interferes with one or more radio access technologies between wireless device 302 and access node 304 (such as a so-called "coverage hole"), and the like. Thus, the availability of the first and second radio access technologies can be determined based on the location of the wireless device within the coverage area of the first communication network. Alternatively, or additionally, the wireless device may provide an indication of the availability of the first and second radio access technologies based, for example, on signals received from an access node. Alternatively, or additionally, an access node identifier can be used to determine whether the first and second radio access technologies are available from the access node, and/or from neighbor access nodes of the access node.

When the wireless device is in communication with the access node using the second radio access technology and the first radio access technology is available for the wireless device (operation 410-Y), the wireless device is prevented from registering with the PTT communication system (operation 412). For example, wireless device 302 would be prevented from registering with the PTT communication system, and would not be permitted, among other things, to initiate and/or receive PTT communication session requests or to participate in PTT communication sessions. When the wireless device is in communication with the access node using the second radio access technology and the first radio access technology is not available for the wireless device (operation 410-N), the wireless device can be permitted from registering with the PTT communication system (operation 414). For example, wireless device 302 would be permitted to register with the PTT communication system, and would be permitted, among other things, to initiate and/or receive PTT communication session requests or to participate in PTT communication sessions.

When the wireless device is not in communication with the first access node at a location in the coverage area of a first communication network using the second radio access technology (408-N), it can be determined that the wireless device is in communication with a second communication network, despite being in a location in a coverage area of a first communication network (operation 416). When the wireless device is in communication over the second communication network, it is determined whether the first radio access technology or the second radio access technology is available at the location in the coverage area of the first communication network (operation 418). In addition to affecting the availability of the first and second radio access technologies, the location of wireless device 302 may also affect the availability of communication services through the first communication network, such as where wireless device 302 is located in an area experiencing radio frequency interference, or where the first communication network itself may have a coverage hole (such as a structure or topographical feature which interferes with network access), and the like. Similarly, a wireless device which is highly mobile can move from one location to another, changing the availability of both communication networks and radio access technologies. For example, wireless device 302 may start outside of coverage area 326 and may initially establish communication over a second communication network. Wireless device 302 may then move to a location within coverage area 326. When wireless device 302 is within coverage area 326 and is communicating over the second communication network, a determination can be made of the availability of the first and second radio access technologies over the first communication network.

When either the first or the second radio access technology is available in the location of the wireless device, and the wireless device is communicating over the second communication network (operation 418-Y), the wireless device is prevented from registering with the PTT communication system (operation 420). For example, it can be determined that, because wireless device 302 is within the coverage area of the first communication network, either the first or second radio access technology of the first communication system will become available relatively soon. In such case, wireless device 302 can be prevented from registering with the PTT communication system until the first or second radio access technology from the first communication network becomes available.

When neither the first nor the second radio access technology is available in the location of the wireless device, and the wireless device is communicating over the second communication network (operation 418-N), the wireless device may be selectively permitted to register with the PTT communication system using the second communication network (operation 422). In order to permit wireless device 302 to access the PTT communication system, registration may be permitted despite wireless device 302 being in communication with the second communication network and not the first communication network at a location within the first communication network coverage area. However, registration with the PTT communication system may be permitted selectively. For example, an access node identifier of the access node with which wireless device 302 is in communication may indicate that neither the first nor the second radio access technology may be available from the first communication network for wireless device 302 within a period of time, and so wireless device 302 can be permitted to register with the PTT communication system. Similarly, the location of wireless device 302 within the coverage area of the first communication network may indicate that neither the first nor the second radio access technology may be available from the first communication network for wireless device 302 within a period of time, as when wireless device 302 is located in a known coverage hole or other area where communication services of the first communication network are below a threshold level (such as a threshold level of signal strength, signal quality, and the like, of either the first or the second radio access technology), and so wireless device 302 can be permitted to register with the PTT communication system. Alternatively, the location of wireless device 302 and/or the access node identifiers may indicate that the first or the second radio access technology may be available from the first communication network for wireless device 302 within a period of time, in which case wireless device 302 can be prevented from registering with the PTT communication system. In an embodiment, the wireless device may be instructed to use the second radio technology when it is permitted to register with the PTT communication system over the second communication network.

In addition, wireless device 302 may be permitted to register with the PTT communication system based on a subscriber level associated with wireless device 302. For example, wireless device 302 may be associated with a higher communication priority than other wireless devices, as may be the case for an emergency responder (e.g., fire departments, police departments, etc.), or for a certain type of subscriber account (for example, a corporate account, a so-called "gold" subscriber, "platinum" subscriber, and the like), or another mechanism whereby a network provider can indicate that the wireless device is to be granted access to communication resources preferentially over other wireless devices, or even in situations where other wireless devices would not be granted access to communication resources. Thus, when neither the first nor the second radio access technology is available in the location of the wireless device, and the wireless device is communicating over the second communication network the wireless device may be selectively permitted to register with the PTT communication system using the second communication network based on the location of the wireless device, an access node identifier, and a subscriber level associated with the wireless device. Other examples or factors which may lead to permitting wireless device 302 to register with the PTT communication system are also possible, including combinations thereof.

A wireless device may also be in a location outside of a coverage area of the first communication network (operation 402-N). For example, to establish initial communication with access node 308, wireless device 306 may send a request to access node 308 for to be granted a channel over a frequency band, and neither the first nor the second radio access technology may be available from the first communication network. When the wireless device is outside the first network coverage area, the wireless device may establish initial communication with an access node associated with the second communication network (operation 424).

A registration request may be received from wireless device 306 to register with the PTT communication system, and the wireless device may be selectively permitted to register with the PTT communication system using the second communication network (operation 426). In such case, registration with the PTT communication system may be permitted selectively based on, for example, on the location of the wireless device, an access node identifier, and a subscriber level associated with the wireless device, analogous to the selective permission of registration of wireless device 302 described above. In an embodiment, the wireless device may be instructed to use the second radio technology when it is permitted to register with the PTT communication system over the second communication network.

Additionally, based on the location of the wireless device and the availability of the first and/or second radio access technology from the first communication network, a handover can be performed of the wireless device to the first and/or second radio access technology of the first communication network (operation 428). For example, the location of wireless device 306 can be monitored while wireless device 306 is communicating over the second communication network. Further, the availability of the first and second radio access technologies of the first network can be determined for the location of wireless device 306. When the wireless device enters the coverage area of the first communication network, a handover may be performed of the wireless device to the first communication network (operation 428). The handover can comprise a handover to a new access node, or it can comprise an intra-frequency handover at an access node from the first communication network to the second communication network, and the like. When a handover is performed of the wireless device to the first communication network, the availability of the first and second radio access technologies can be determined.

Figure 5:
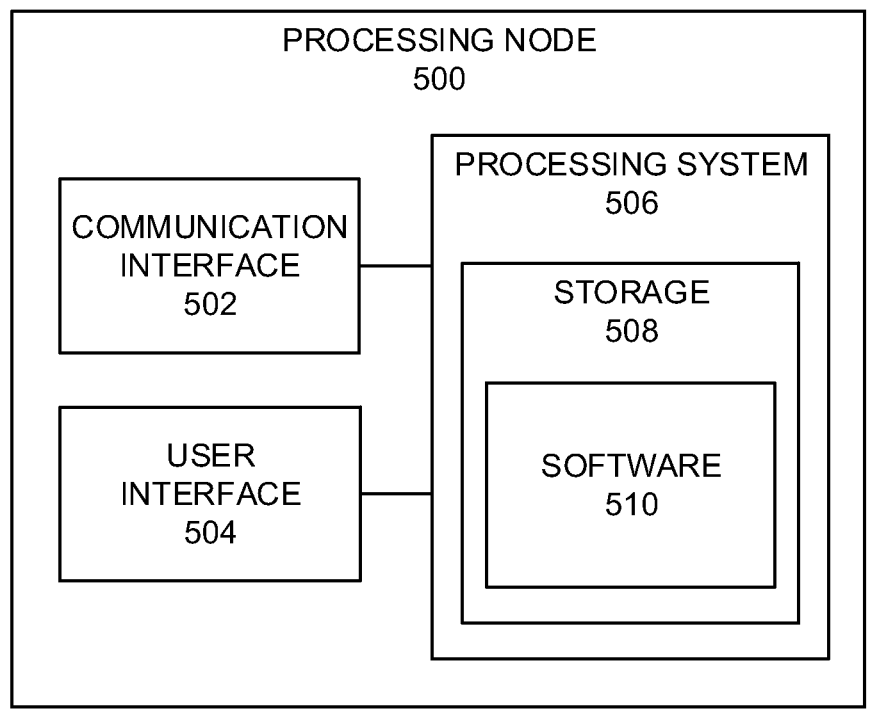
FIG. 5 illustrates an exemplary processing node.

FIG. 5 illustrates an exemplary processing node 500 in a communication system. Processing node 500 comprises communication interface 502, user interface 504, and processing system 506 in communication with communication interface 502 and user interface 504. Processing node 500 can be configured to manage registration of a wireless device with a push-to-talk (PTT) communication system. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

Examples of processing node 500 include application node 312, and access nodes 104, 304 and 308. 310. Processing node 500 can also be an adjunct or component of a network element, or another network element in a communication system. Further, the functionality of processing node 500 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method of managing registration of a wireless device with a push-to-talk (PTT) communication system, comprising:
determining, at an application node of the PTT communication system, a geographic location of the wireless device and, based on the geographic location, determining that the wireless device is within a coverage area of PTT communication services provided by a first communication network;
receiving, at the application node, a PTT registration request from the wireless device requesting permission to register with the PTT communication system for PTT communication services;
permitting, at the application node, the PTT registration request from the wireless device when the wireless device is in communication with the first communication network at a first access node via a first radio access technology and a second radio access technology is unavailable for the wireless device at the geographic location of the wireless device and in the PTT coverage area;
denying, at the application node, the PTT registration request from the wireless device when the wireless device is in communication with the first communication network at the first access node via the first radio access technology and the second radio access technology is available for the wireless device at the geographic location of the wireless device and in the PTT coverage area; and,
selectively permitting, at the application node, the PTT registration request from the wireless device at a second access node using a second communication network when both the first radio access technology and the second radio access technology of the first communication network are unavailable for the wireless device at the geographic location of the wireless device and in the PTT coverage area.

2. The method of claim 1, wherein the PTT registration request is selectively permitted at the second access node using a second communication network based on the location of the wireless device, an access node identifier of the second access node, and a subscriber level of the wireless device.

3. The method of claim 1, further comprising:
determining that the second radio access technology is available at a second access node of the first communication network when the PTT registration request is received from the wireless device at the first access node of the first communication network;
instructing, based on the PTT registration request, the wireless device to change from communicating with the first access node of the first communication network to communicating with the second access node of the first communication network using the second radio access technology; and
based on the authenticated credentials of the wireless device for PTT communication services, permitting the wireless device to register with the PTT communication system using the second radio access technology.

4. The method of claim 1, further comprising:
determining, at the application node, that the wireless device is at a geographic location outside the coverage area of the PTT communication services provided by the first communication network; and
selectively permitting, at the application node, the wireless device to register with the PTT communication system at the second access node using the second communication network and using the first radio access technology based on the geographic location of the wireless device outside the coverage area of the PTT coverage area of the first communication network, an access node identifier of the first access node or the second access node, and a subscriber level of the wireless device.

5. The method of claim 1, further comprising:
permitting, at the application node, the PTT registration request and an incoming call request for the wireless device using the second radio access technology when the wireless device is in communication with the first access node using the second radio access technology; and
preventing, at the application node, the PTT registration request and the wireless device from making and receiving call requests using the first radio access technology when the wireless device is in communication with the first access node using the first radio access technology and the second radio access technology is available for the wireless device.

6. A system of managing registration of a wireless device with a push-to-talk (PTT) communication system, comprising:
a processing node, configured to:
determine, at an application node of the PTT communication system, a geographic location of the wireless device and, based on the geographic location, determine that the wireless device is within a coverage area of PTT communication services provided by a first communication network;
receive, at the application node, a PTT registration request from the wireless device requesting permission to register with the PTT communication system for PTT communication services;
permit, at the application node, the PTT registration request from the wireless device when the wireless device is in communication with the first communication network at a first access node via a first radio access technology and a second radio access technology is unavailable for the wireless device at the geographic location of the wireless device and in the PTT coverage area;
deny, at the application node, the PTT registration request from the wireless device when the wireless device is in communication with the first communication network at the first access node via the first radio access technology and the second radio access technology is available for the wireless device at the geographic location of the wireless device and in the PTT coverage area;
selectively permit, at the application node, the PTT registration request from the wireless device at a second access node using a second communication network when both the first radio access technology and the second radio access technology of the first communication network are unavailable for the wireless device at the geographic location of the wireless and in the PTT coverage area.

7. The system of claim 6, wherein the processing node is further configured to:

selectively permit the wireless device to register with the PTT communication system using the second communication network based on the geographic location of the wireless device, an access node identifier of the first access node or second access node, and a subscriber level associated with the wireless device when the first radio access technology and the second radio access technology of the first communication network are unavailable from the first communication network.

8. The system of claim 6, wherein the processing node is further configured to:
   determine that the second radio access technology is available at a second access node of the first communication network when the PTT registration request is received from the wireless device at the first access node of the first communication network and the wireless device is in communication with the first access node using the first radio access technology;
   instruct the wireless device to change from communicating with the first access node of the first communication network to communicating with the second access node of the first communication network using the second radio access technology; and
   permit the wireless device to register with the PTT communication system using the second radio access technology.

9. The system of claim 6, wherein the processing node is further configured to:
   determine, at the application node, that the wireless device is at a geographic location outside the PTT coverage area of the first communication network; and
   selectively permit, at the application node, the wireless device to register with the PTT communication system at the second access node using the second communication network and using the first radio access technology based on the geographic location of the wireless device outside the PTT coverage area of the first communication network, an access node identifier of the first access node or the second access node, and a subscriber level associated with the wireless device.

10. The system of claim 6, wherein the processing node is further configured to:
    permit, at the application node, the wireless device to register with the PTT communication system and to receive an incoming call request for the wireless device using the second radio access technology when the wireless device is in communication with the first access node using the second radio access technology; and
    prevent, at the application node, the wireless device from registering with the PTT communication system and from making and receiving call requests using the first radio access technology when the wireless device is in communication with the first access node using the first radio access technology and the second radio access technology is available for the wireless device.

* * * * *